United States Patent
Pincenti et al.

(10) Patent No.: US 6,708,023 B1
(45) Date of Patent: Mar. 16, 2004

(54) METHOD AND APPARATUS FOR NOISE SUPPRESSION OF RECEIVED AUDIO SIGNAL IN A CELLULAR TELEPHONE

(75) Inventors: John C. Pincenti, Des Plaines, IL (US); Daniela Radakovic, Park Ridge, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/513,358

(22) Filed: Feb. 25, 2000

(51) Int. Cl.[7] .................................................. H04B 1/10
(52) U.S. Cl. ........................ 455/222; 455/219; 381/94.1
(58) Field of Search ................................ 455/221, 223, 455/225, 232.1, 239.1, 249.1, 63.1, 67.13, 219, 296, 222; 379/390.03, 416; 381/94.1–94.9, 110, 56

(56) References Cited

U.S. PATENT DOCUMENTS

| | | | |
|---|---|---|---|
| 4,703,507 A | * | 10/1987 | Holden ...................... 381/94.3 |
| 5,220,220 A | | 6/1993 | Tse et al. |
| 5,297,213 A | * | 3/1994 | Holden ........................ 381/110 |
| 5,303,408 A | | 4/1994 | Ghomeshi et al. |
| 5,323,457 A | * | 6/1994 | Ehara et al. ................. 375/346 |
| 5,533,133 A | * | 7/1996 | Lamkin et al. ............ 381/94.5 |
| 5,742,694 A | * | 4/1998 | Eatwell ....................... 381/94.2 |
| 6,026,310 A | * | 2/2000 | Auroux ....................... 455/570 |

* cited by examiner

Primary Examiner—Charles Appiah
Assistant Examiner—James Moore
(74) Attorney, Agent, or Firm—Lawrence Chapa; Randall S. Vaas

(57) ABSTRACT

In a cellular telephone, a method of reducing background noise of an audio signal resulting from a received signal. Each digital sample of the audio signal is used to calculate an average energy of the audio signal over a number of samples. When the average energy is less than a threshold, a gain factor is calculated using the average energy and the threshold. The amplitude of the audio sample is then adjusted according to the gain factor.

11 Claims, 2 Drawing Sheets

METHOD AND APPARATUS FOR NOISE SUPPRESSION OF RECEIVED AUDIO SIGNAL IN A CELLULAR TELEPHONE

FIELD OF THE INVENTION

This invention generally relates to noise suppression in an audio signal. More specifically, this invention relates to reduction of background noise of an audio signal derived from a received signal in a cellular telephone.

BACKGROUND OF THE INVENTION

Some digital cellular telephones operable in a time division multiple access (TDMA) system exhibit a high level of background noise in the audio signal of received signals. This high background noise is determined to be system noise and has been found to be present in various TDMA systems operable on various frequency bands. The background noise appears during pauses or breaks in the intelligent portion of the audio signal (e.g. breaks in a caller's speech pattern). At higher volumes settings of the cellular telephone, the user can easily hear this background noise, and this condition is unsatisfactory to the user. Hence, there is a need to reduce the background noise level while not otherwise impacting the discernible audio quality of a received signal.

DETAILED DESCRIPTION OF PREFERRED EMBODIMENTS

Figure 1:
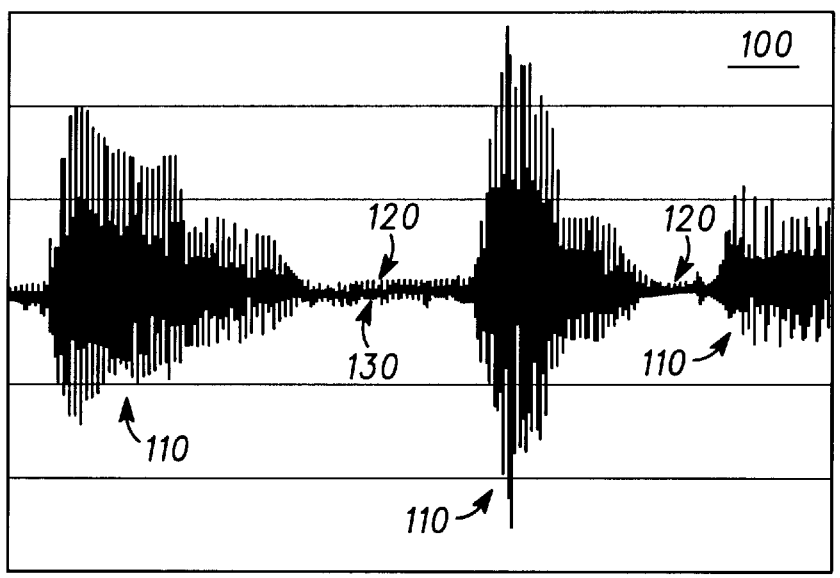
FIG. 1 is a representation in the time domain of a typical audio portion of a received signal of a digital cellular telephone.

FIG. 1 is a representation in the time domain of a typical audio signal 100 that a digital cellular telephone processes from a received signal. The digital cellular telephone is operable in a time division multiple access (TDMA) system so that it receives and transmits information only at discrete, designated times. Intelligent portions 110 of the audio signal 100 and non-intelligent portions 120 are shown. The intelligent portions 110 represent portions of the audio signal when actual (audio) information is present (e.g. when a caller's voice is present). The non-intelligent portions 120 represent breaks in the speech pattern of the caller.

FIG. 1 shows that part of the non-intelligent portions 120 includes a high background noise portion 130. This is the problem noise that must be reduced to improve audio quality.

Figure 2:
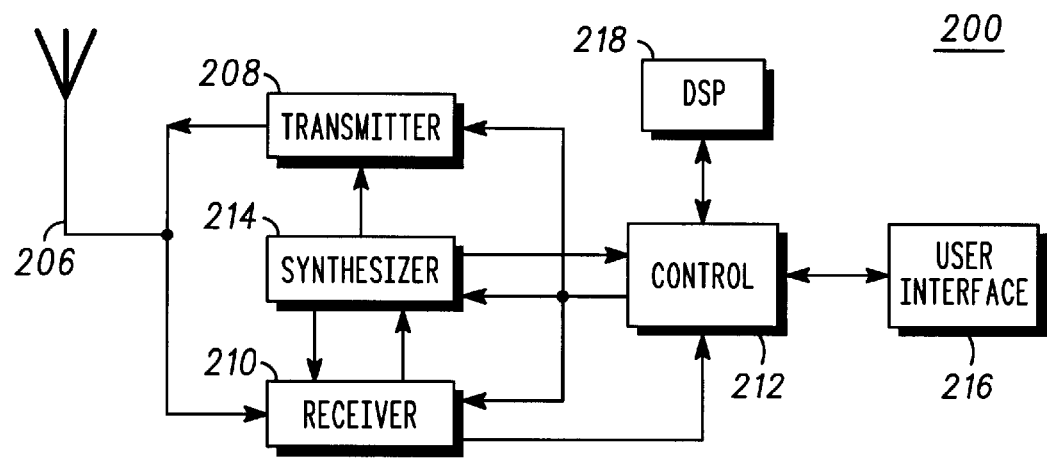
FIG. 2 is a block diagram of a digital cellular telephone incorporating a digital signal processor (DSP) in accordance with the present invention.

FIG. 2 is an illustration in block diagram form of a digital cellular telephone 200 in accordance with the present invention. The digital cellular telephone 200 sends and receives RF signals to and from at least one base station (not shown). The digital cellular telephone includes an antenna 206, a transmitter 208, a receiver 210, control block 212, a synthesizer 214, a user interface 216, and a digital signal processor (DSP) 218.

To transmit RF signals containing transmit data (such as voice, digital information, or control signals) from the digital cellular telephone 200 to a remote base station, the user interface 216 directs user input data (e.g. voice information) to the control block 212 and the DSP 218. The control block 212 is meant to encompass various circuits and elements used to control the digital cellular telephone 200 and to process signals. Therefore, here, the control block 212 provides for an analog-to-digital conversion of the user input information into digital input information as is known in the art. The digitized user input information is directed to the DSP 218 and filtered, and the filtered signal is processed by a vocoder within the DSP 218 as is known in the art.

The processed signal is directed back to the control block 212 for any further processing, and the control block 212 then conveys the transmit data to the transmitter 208 for conversion into RF modulated signals. The transmitter 208 conveys the RF modulated signals to the antenna 206 for transmission to the remote transceiver 202.

The digital cellular telephone 200 detects RF signals containing receive data through the antenna 206 and produces detected RF signals. The receiver 210, coupled to the antenna 206, converts the detected RF signals into electrical baseband signals, demodulates the electrical baseband signals, recovers the receive data, and outputs the receive data to the control block 212 as is known in the art. The control block 212 digitizes the receive data as is known in the art and directs the digitized receive data to the DSP 218.

The DSP 218 has a vocoder to process the receive data, and the DSP 218 directs the processed receive data back to the control block 212 for conversion to an analog signal. The analog signal is then directed to the user interface 216 for use by the user interface 216. The user interface 216 communicates the received information or voice to a user. Typically, the user interface 216 includes a microphone, a speaker, a display, and a keypad. Particular operation of the DSP 218 in accordance with the present invention is described in further detail below.

The synthesizer 214 generates RF signals for use by the receiver 210 and the transmitter 208 to allow the reception and transmission of information. Control over the channel of operation frequency is provided by the control logic 212 to the synthesizer 214.

Figure 3:
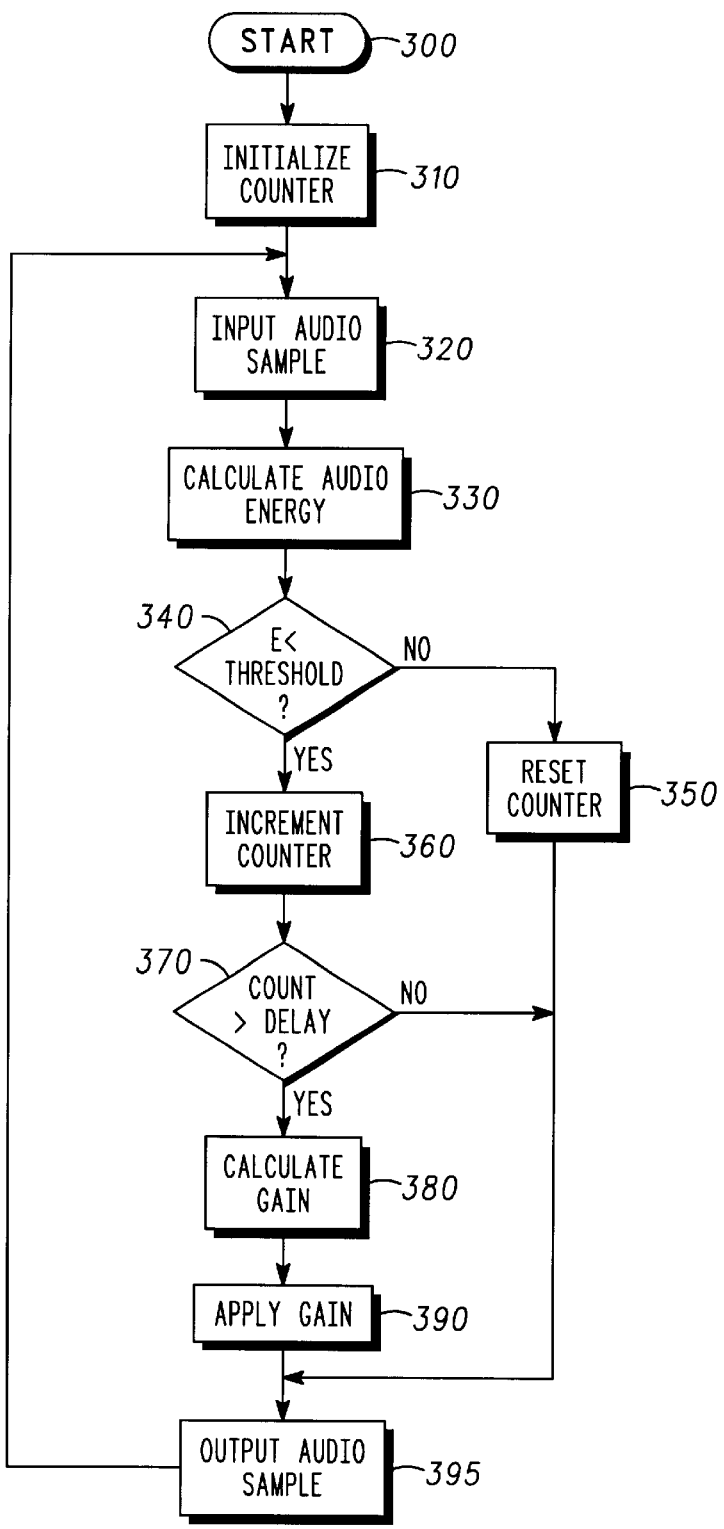
FIG. 3 is a flow chart illustrating a method of reducing the background noise in the audio portion of the received signal of the digital cellular telephone of FIG. 2.

FIG. 3 is a flow chart illustrating a method using the DSP 218 (FIG. 2) to reduce background noise of an audio signal produced from a signal received by the digital cellular telephone 200. The method begins at block 300, and at block 310 a counter within the DSP 218 is initialized. At block 320 the DSP 218 recieves a digitized audio signal from the control block 212 and produces an audio sample x(n) via the vocoder (not shown) within the DSP 218. This audio sample x(n) is thus the output of the DSP 218 vocoder portion as is known in the art. In the illustrated embodiment the sampling rate is 8 KHz, but other sample rates can be used.

At block 330 the DSP 218 calculates with the audio sample x(n) an average energy of the audio signal over a predetermined number of samples N. The average energy is calculated with equation 1, as follows:

$$E = \sum_{k=n-N+1}^{n} x[k]^2 \qquad (1)$$

where E is the average energy, n is the audio sample to be analyzed, and N is the predetermined number of samples. In the illustrated embodiment, the predetermined number of samples is sixteen, but other sample spaces can be used. In alternate embodiment, the predetermined number of samples is generally referred to as just a number of samples, and the number of samples, for example, can be actively determined.

The DSP 218 calculates an average energy to help the DSP 218 make a determination as to whether the audio sample represents an intelligent portion of the audio signal. Thus, the DSP 218 calculates the average energy to make its determination rather than making a determination based only on each individual audio sample. This helps the DSP 218 avoid step discontinuities in the noise level which would otherwise produce an undesirable "flutter" in the background noise. Thus, if during a period in which a number of audio samples in a row indicate non-intelligent portions of the audio signal, and then a "spike" audio sample erroneously indicates an intelligent portion, the averaging allows the DSP 218 to correctly treat the spike as an error by continuing to attenuate the audio sample at the correct level.

At decision block 340 the DSP 218 compares the average energy to a predetermined threshold to determine whether the average energy is less than or greater than a predetermined threshold. In the illustrated embodiment, the predetermined threshold is chosen to be 60 dB below the maximum level of the DSP. This level is dependant upon the particular DSP used and dependant upon the acceptable level of background noise selected. Other levels may be chosen depending upon the particular DSP used and upon the subjective quality of background noise desired. Note that in alternate embodiments the predetermined threshold is generally referred to as just a threshold, and this threshold, for example, can be one of a plurality of values which may be actively determined.

An average energy above the predetermined threshold indicates that the audio sample likely represents an intelligent portion of the audio signal (so that the amplitude of the audio sample should not be adjusted). In that case, the counter within the DSP 218 is reset at block 350. At block 395 the audio sample is output from the DSP 218 and applied to the user interface 216 (FIG. 2) for transmission to the user as is known in the art. The method resumes at block 320 where another audio sample is received for analysis.

If at decision block 340 the DSP 218 determines that the average energy is below the predetermined threshold, then the DSP 218 increments the counter by one at block 360. At decision block 370, the DSP 218 compares the count value of the counter to a predetermined delay. In the illustrated embodiment the predetermined delay is on the order of 100 msec, but other delays can be utilized.

A predetermined delay is used to reduce distortion of the audio signal during brief pauses between a caller's speech pattern. Thus, the counter within the DSP 218 provides a delay that must be reached before the DSP 218 performs additional processing (e.g. gain adjustment) of the audio signal. This built in delay provides significant improvement in decision analysis by acting as a type of hysteresis. Thus, if the noise level is moving about the threshold, the built in delay prevents false triggering.

If at decision block 370 the DSP determines that the count value is less than the predetermined delay, then the method continues at block 395 as described previously. Note however, that in this instance the count value has been incremented by one before the method returns to block 320.

If at decision block 370 the DSP determines that the count value is greater than the predetermined delay, the DSP 218 calculates a gain factor using the average energy and the predetermined threshold. The gain factor is calculated according to equation two as follows.

$$G = \frac{E^2}{E_T^2} \quad (2)$$

where G is the gain factor, E is the average energy, and $E_T$ is the predetermined threshold energy. Thus, for substantially each different moving average energy below the threshold, the gain factor comprises one of a plurality of substantially different gain factor values. Stated differently, the gain factor is variable among a continuum of values.

This variable gain factor provides significant performance advantage over systems that just toggles the gain between, for example, two different discrete values. For example, discretely switching between only two gain factors could cause the background noise to sound unnatural in that the background noise could toggle between background noise and no noise. Having a continuum of gain factors provides for adjustment of the background noise in a manner that is not as readily discernible to the listener.

In alternate embodiments, different methods can be used to calculate the continuum of gain factor values. For example, the gain factor can be of the first order rather than of the second order, or the gain factor can be of an even higher order. Additionally, instead of being based upon a polynomial function, the gain factor can be based on a trigonometric function (e.g. sine or cosine).

At block 390 the DSP 218 adjusts the amplitude of the audio sample according to the gain factor. In the illustrated embodiment the audio sample is mathematically multiplied by the gain factor. Note that if the amplitude of the audio sample which represents a non-intelligent portion here is too high, the gain factor will be such to reduce the amplitude of the audio sample. The predetermined threshold is chosen so as to provide an acceptable noise sound to the listener during breaks in the caller's speech pattern. Note also that in alternate embodiments, the gain factor can be calculated differently, and the amplitude of the audio sample can be adjusted differently without the use of the inventive faculty. After the amplitude of the audio sample is adjusted at block 390, the method continues at block 395 as was described previously.

The previous description of the preferred embodiments are provided to enable any person skilled in the art to practice the preferred embodiments as describe in this section. Various modifications to these embodiments will be readily apparent to those skilled in the art, and the generic principles defined herein may be applied to other embodiments without the use of the inventive faculty. For example, in an alternate, novel embodiment, the noise reduction is achieved not totally through the use of a DSP; at least some functionality is performed using circuitry outside of the DSP. In addition, the noise suppression described herein was with reference to a digital cellular telephone operable in a TDMA system. The noise suppression described herein can also be used with other types of cellular systems, such as code division multiple access (CDMA) systems, or more generally any cellular telephone that digitizes the audio signal resulting from a received signal.

What is claimed is:

1. In a cellular telephone, a method of using a digital signal processor (DSP) to reduce background noise of an audio signal derived from a received signal, the method comprising:

detecting an audio sample;

calculating with the audio sample an average energy of the audio signal over a number of samples;

incrementing a count value responsive to determining that the average energy is less than a threshold;

calculating a gain factor using the average energy and the threshold responsive to determining that the count value is greater than a predetermined delay; and adjusting an amplitude of the audio sample according to the gain factor.

2. The method of claim 1 wherein the gain factor is a variable gain factor having a magnitude less than or equal to one.

3. The method of claim 2 wherein the audio sample comprises a digital sample of the audio signal.

4. A method of using a digital signal processor (DSP) in a cellular telephone of a called party to reduce background noise of an audio signal derived from a received signal, the method comprising:

calculating with each digital sample of the audio signal a moving average energy of the audio signal;

comparing the moving average energy to a threshold;

incrementing a count value responsive to determining that the moving average energy is less than the threshold;

comparing the count value to a predetermined delay;

calculating a gain factor using the moving average energy and the threshold when the DSP determines that the count value is greater than the predetermined delay; and adjusting an amplitude of the audio sample according to the gain factor.

5. The method of claim 4 wherein the DSP adjusts the amplitude of the audio sample by mathematically multiplying the audio sample by the gain factor.

6. The method of claim 4 wherein the gain factor is variable among a continuum of values.

7. The method of claim 6 wherein the gain factors is in a range substantially between zero and one.

8. The method of claim 7 wherein the gain factor can comprise a value substantially equal to zero or one.

9. In a cellular telephone of a called party, a method of reducing a background noise of an audio signal derived from a received signal, the method comprising:

generating digital samples of the audio signal;

calculating with each of the digital samples a moving average energy;

comparing the moving average energy to a threshold;

incrementing a count value responsive to determining that the moving average energy is less than the threshold;

comparing the count value to a delay;

calculating, responsive to the count value being greater than the delay, a gain factor using the moving average energy and the threshold; and adjusting an amplitude of the audio sample according to the gain factor.

10. The method of claim 9 wherein the gain factor is variable among a continuum of values.

11. A method of using a digital signal processor (DSP) in a cellular telephone of a called party to reduce background noise of an audio signal derived from a received signal, the method comprising:

calculating with each digital sample of the audio signal a moving average energy of the audio signal;

comparing the moving average energy to a threshold;

calculating a gain factor using the moving average energy and the threshold responsive to determining that the moving average energy is less than the threshold, wherein for substantially each different moving average energy below the threshold, the gain factor comprises one of a plurality of substantially different gain factor values; and adjusting an amplitude of the audio sample according to the gain factor.

* * * * *